United States Patent
Lim et al.

(10) Patent No.: US 7,505,795 B1
(45) Date of Patent: Mar. 17, 2009

(54) POWER SAVE MANAGEMENT WITH CUSTOMIZED RANGE FOR USER CONFIGURATION AND TUNING VALUE BASED UPON RECENT USAGE

(75) Inventors: Vincent Cheekiat Lim, Austin, TX (US); Preetham Raghuvanshi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 105 days.

(21) Appl. No.: 10/886,350

(22) Filed: Jul. 7, 2004

(51) Int. Cl.
*H04B 1/38* (2006.01)

(52) U.S. Cl. .................. 455/574; 455/572; 455/573; 455/127.5; 455/343.1; 455/41.2; 370/311; 370/312; 340/7.38; 713/320

(58) Field of Classification Search ......... 455/572–574, 455/343.1–343.6, 127.4–127.5, 41.2; 370/311; 340/7.38; 713/320
See application file for complete search history.

(56) References Cited

U.S. PATENT DOCUMENTS

| | | | |
|---|---|---|---|
| 5,301,225 A * | 4/1994 | Suzuki et al. ............. 455/574 |
| 5,584,048 A * | 12/1996 | Wieczorek ............... 340/7.33 |
| 5,758,278 A * | 5/1998 | Lansdowne .............. 455/343.4 |
| 5,883,885 A * | 3/1999 | Raith ..................... 370/311 |
| 5,889,772 A | 3/1999 | Fischer et al. ........... 370/346 |
| 6,078,826 A * | 6/2000 | Croft et al. .............. 455/574 |
| 6,212,398 B1 * | 4/2001 | Roberts et al. ........... 455/502 |
| 6,278,864 B1 | 8/2001 | Cummins et al. ......... 455/73 |
| 6,473,607 B1 * | 10/2002 | Shohara et al. .......... 455/343.1 |
| 6,501,969 B1 * | 12/2002 | Cannon et al. ........... 455/574 |
| 6,505,058 B1 * | 1/2003 | Willey .................... 455/574 |
| 6,628,972 B1 * | 9/2003 | Lee ....................... 455/574 |
| 6,639,907 B2 * | 10/2003 | Neufeld et al. .......... 370/342 |
| 6,741,836 B2 * | 5/2004 | Lee et al. ................ 455/41.2 |
| 6,804,542 B1 * | 10/2004 | Haartsen ................. 455/574 |
| 6,829,493 B1 * | 12/2004 | Hunzinger ............... 455/574 |
| 7,184,799 B1 * | 2/2007 | Jin et al. ................. 455/574 |
| 7,295,827 B2 * | 11/2007 | Liu et al. ................ 455/343.2 |
| 2004/0235536 A1 * | 11/2004 | Kim et al. ............... 455/574 |

OTHER PUBLICATIONS

U.S. Appl. No. 10/701,108, filed Nov. 4, 2003, Flemming et al.
U.S. Appl. No. 10/147,413, filed Dec. 28, 2001, Rosner et al.
U.S. Appl. No. 10/147,426, filed Dec. 28, 2001, Rosner et al.
U.S. Appl. No. 10/147,425, filed Dec. 28, 2001, Rosner et al.
"AMD Alchemy™ Solutions Am1772™ Wireless LAN Chipset," http://www.amd.com/us-en/ConnectivitySolutions/ProductInformation/0..50_2330_7518.00.html, printed Oct. 25, 2004, 2 pages.

(Continued)

*Primary Examiner*—Sharad Rampuria
(74) *Attorney, Agent, or Firm*—Hamilton & Terrile, LLP; Michael Rocco Cannatti

(57) ABSTRACT

A method and system for efficiently managing power consumption in a mobile device controls power consumption with an adjustable sleep period or listening interval that may be user-specified and automatically tuned based on recent detected usage. With an adjustable sleep period, a receiver conserves power by leaving a sleep mode only at predefined and adjustable periods, which may be selected by the user to balance connectivity and power saving and which may be automatically incremented when the device activity is low.

19 Claims, 4 Drawing Sheets

OTHER PUBLICATIONS

"AMD Alchemy™ Solutions," http://www.amd.com/us-en/ConnectivitySolutions/ProductInformation/0..50_2330_6631.00.html, printed Oct. 25, 2004, 2 pages.

"The AMD Alchemy™ Solutions Wireless LAN Mini PCI Reference Design Kit" brochure, 2 pages.

* cited by examiner

POWER SAVE MANAGEMENT WITH CUSTOMIZED RANGE FOR USER CONFIGURATION AND TUNING VALUE BASED UPON RECENT USAGE

BACKGROUND OF THE INVENTION

1. Field of the Invention

The present invention relates in general to the field of data processing. In one aspect, the present invention relates to a method and system for reducing power consumption in a wireless communications device.

2. Description of the Related Art

In general, data processors are capable of executing a variety of instructions. Processors are used in a variety of applications, including communication systems formed with wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital amps, global system for mobile communications (GSM), code division multiple access (CDMA), local multipoint distribution systems (LMDS), multi-channel-multi-point distribution systems (MMDS) and/or variations thereof.

Especially with wireless and/or mobile communication devices (such as a cellular telephone, two-way radio, personal digital assistant (PDA), laptop computer, home entertainment equipment, etc.), the processor or processors in a device must be able to run various complex communication programs using only a limited amount of power that is provided by power supplies, such as batteries, contained within such devices.

For example, for a wireless communication device to participate in wireless communications, the device includes a built-in radio transceiver (i.e., receiver and transmitter) or is coupled to an associated radio transceiver (e.g., a station for in-home and/or in-building wireless communication networks, RF modem, etc.). To implement the transceiver function, a transmitter is provided which typically includes a data modulation stage, one or more intermediate frequency (IF) stages and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna. In addition, one or more processors and other modules are used to form a receiver which is typically coupled to an antenna and includes a low noise amplifier, one or more intermediate frequency stages, a filtering stage and a data recovery stage. The low noise amplifier receives inbound RF signals via the antenna and amplifies them. The intermediate frequency stages mix the amplified RF signals with one or more local oscillations to convert the amplified RF signal into baseband signals or intermediate frequency signals. The filtering stage filters the baseband signals or the intermediate frequency (IF) signals to attenuate unwanted out-of-band signals to produce filtered signals. The data recovery stage recovers raw data from the filtered signals in accordance with the particular wireless communication standard.

Because of the computational intensity (and the associated power consumption by the processor(s)) for communications transceiver functions, it is an important goal in the design of wireless and/or mobile communication devices to minimize processor and other module operations (and the associated power consumption). It is particularly crucial for mobile applications in order to extend battery life. With conventional solutions for saving power, a variety of complex circuit and hardware designs have been proposed. These mechanisms typically implement CPU clock management by switching between an active mode and an idle mode. In the idle mode, the processor has no work to do and the CPU stops its clocking and waits for an interrupt or uses a predetermined and fixed sleep interval to periodically power-up to check for work activity. In the active mode, the CPU resumes its maximum pre-configured clock speed. These approaches do not provide sufficient flexibility to maximize power savings to the extent that may be desired. Nor do these approaches provide for power management that responds to user-related activity to adjust power consumption. In addition, the interrupt-based approach can result in substantial latencies for entering and leaving the idle mode, which restricts the power that can be saved and the range of applicability because these latencies may preclude a processor from being able to deactivate modules before having to reactivate them. Indeed, many interrupt-based implementations are based on complex signaling mechanisms and processor state transitions which require significant hardware and software support and also exhibit long latencies.

In addition to the complexity of the computational requirements for a communications transceiver, such as described above, the ever-increasing need for higher speed communications systems imposes additional performance requirements and resulting costs for communications systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS. To this end, digital signal processing ("DSP") techniques generally allow higher levels of complexity and easier scaling to finer geometry technologies than analog techniques, as well as superior testability and manufacturability.

Therefore, a need exists for a method and apparatus that provides reduced power consumption. In addition, a need exists for reducing power consumption without requiring complex hardware and elaborate signaling mechanisms. Moreover, a need exists for improved selectivity when determining the nature and extent of the required power-up operations. There is also a need for a better system that is capable of performing the above functions and overcoming these difficulties without increasing circuit area and operational power. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention provides an efficient, intelligent and adaptive method and system for managing power usage by adapting the sleep interval for a communication device on a continuous basis during runtime, depending upon the device work load and/or user-specified performance requirements. By tuning the sleep period of the signal processing hardware (such as a CPU or transceiver circuitry) to the actual workload using a software-based approach for collecting recent usage and/or traffic activity, power savings can be increased by extending the wakeup intervals when the workload permits. In addition, a selected embodiment of the present invention enables a predefined or default sleep period or listening interval to be adjusted customized by the user through a software interface which allows the user to customize the level of power savings with an acceptable connectivity or performance. In any implementation, the remote transmitting/receiving station (such as a base station or access point) may coordinate its transmission/reception activity with the sleep interval so that signals transmitted to or received from the communication device are not dropped.

In accordance with various embodiments of the present invention, a method and apparatus provide a power saving mechanism for any embedded device using wireless technology, communications processor technology and/or connectivity technology. In an exemplary embodiment, a power saving mechanism dynamically adjusts the listen period of a wireless communication device, such as an 802.11 station, based on recent communication traffic of the device. The power saving mechanism may be implemented to save battery life without sacrificing functionality by continuously and automatically adjusting the sleep interval for receiver operations in response to actual device activity to maintain a target level of performance, thereby providing improved effectiveness, reduced latency, simplified programming and reduced hardware overhead. In a selected embodiment, the sleep interval may be adjusted or controlled through user input that increases power saving to a level that is acceptable to the user in terms of the resulting device performance. In a wireless communication device implementation, power save operations for a communication device are controlled by setting a listening interval at a default value and placing a communication device in a sleep mode until the listening interval expires, at which time the communication device is powered up to detect if there is any activity for the communication device before returning to sleep mode. By monitoring an activity measure for the communication device, the listening interval may be dynamically adjusted under control of software when a change in the activity measure is detected. For example, the listening interval may be lengthened when the communication device has been inactive for more than a threshold amount of time or when traffic activity on the communication device is below a threshold value. When traffic activity is detected on the communication device or is above a threshold value, the listening interval may be returned to the default value.

The objects, advantages and other novel features of the present invention will be apparent to those skilled in the art from the following detailed description when read in conjunction with the appended claims and accompanying drawings.

DETAILED DESCRIPTION

Figure 1A:
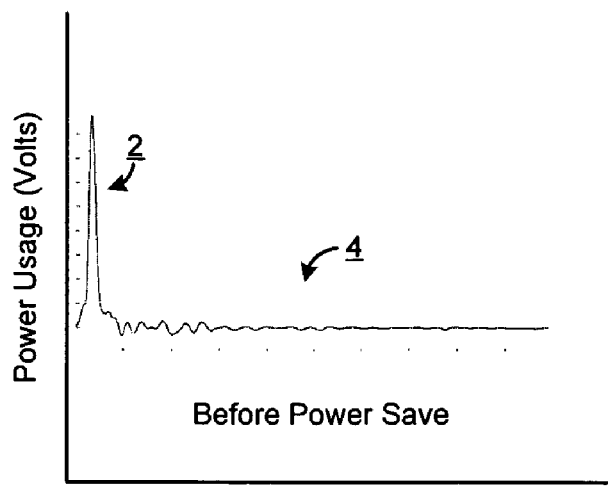
FIGS. 1(a)-(c) depict simplified plot representations of the power consumption in a mobile device before and after a power saving management embodiment of the present invention is implemented.

A method and apparatus for an improved communications device is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In accordance with a selected embodiment, the methods and systems for providing efficient and adaptive power management as shown and described herein may be implemented in software and/or hardware control logic stored on a computer-readable medium and executed as a computer program on a general purpose or special purpose computer. The invention, for example, can be implemented in single or multiprocessor wireless cellular communication devices, such as GSM (Global System for Mobile Communications), GPRS (General Packet Radio Services), EGPRS (Enhanced GPRS), 3G or EDGE (Enhanced Data GSM Environment) cell phone devices. For clarity, only those aspects of the functionality germane to the invention are described, and product details well known in the art are omitted. For the same reason, the computer hardware is not described in further detail. It should thus be understood that the invention is not limited to any specific computer language, program, or computer, and that, in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1B:
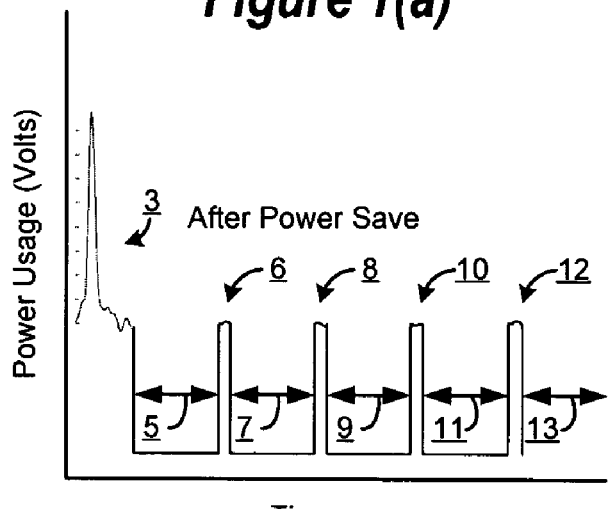
Figure 1C:
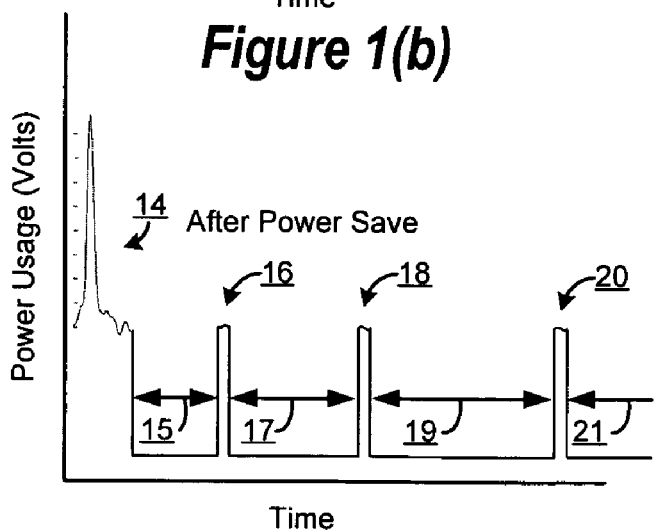

Referring to FIG. 1(*a*), a simplified plot representation is shown of the power consumption in a mobile device before various power saving management embodiments of the present invention are implemented. Before power saving is implemented, the power usage spikes up when there are specific device functions being executed (as indicated at region 2), but when there are no active device functions (as indicated at region 4), the mobile device is constantly using current to maintain connectivity. For example, if the receiving function of the transceiver in the mobile device is constantly maintained "on," then the device continually consumes power to support this function. While this mode of operation may provide maximum connectivity, it also maximizes power consumption at all times, even when the mobile device is not actively requiring connectivity.

The present invention provides a method and system for maintaining the connectivity when required, but reducing the power consumption when connectivity is not required and/or reducing the power consumption to a level that maintains acceptable connectivity. As illustrated in FIG. 1(*b*), power savings is obtained by placing all or part of the mobile device (e.g., receiver circuitry) in a sleep mode whereby the device is "off" or idled for an adaptable sleep period or listening interval (e.g., defined intervals 5, 7, 9, 11, 13), after which the device powers up the idled circuitry to detect if there is any device activity required (e.g., defined power up events 6, 8, 10, 12). If there is no device activity required, the device returns to the sleep mode, and the cycle is repeated. As will be appreciated, the remote transmitting/receiving station (such as a base station or access point) may coordinate its transmission/reception activity with the sleep period or listening interval to prevent signal drops. The sleep mode is disabled when there is device activity (as indicated at waveform segment 3).

As indicated with defined intervals 5, 7, 9, 11, 13, the sleep interval or listening interval may be set at a user-specified duration. In addition, a selected embodiment of the present invention permits the duration to be automatically incremented to improve power savings when the device operations permit. As illustrated in FIG. 1(*c*), after a first interval 15 is used to power up the device (at event 16), if there is no required device activity, a second, longer interval 17 is used to extend the device sleep mode. By monitoring device activity, such as connectivity operations, the succeeding intervals (19, 21, etc.) can continue to be extended up to a maximum sleep interval value, thereby increasing power savings for the device. Of course, the mobile device may transmit timing information to the remote transmitting/receiving station (such as a base station or access point) as the interval changes to coordinate signaling between the mobile device and the remote station to prevent signal drops.

In accordance with various embodiments of the present invention, the adaptable sleep period may initially be set to a default duration to provide a minimum level of power savings, but this duration may also be adjusted to change the power savings. For example, the duration may be adjusted by direct user input to change the duration to increase the power saving to a level that maintains acceptable device performance for the user. In this way, the user can directly control the power savings, depending on the applications being run on the device at a given time. Thus, power saving could be increased if the user is not requiring a high level of connectivity, and could be decreased if the user decides that higher connectivity is required. As another example, the duration may be automatically adjusted, based on the detected device activity, so that the duration is automatically incremented when there is a low amount of device activity.

Figure 2:
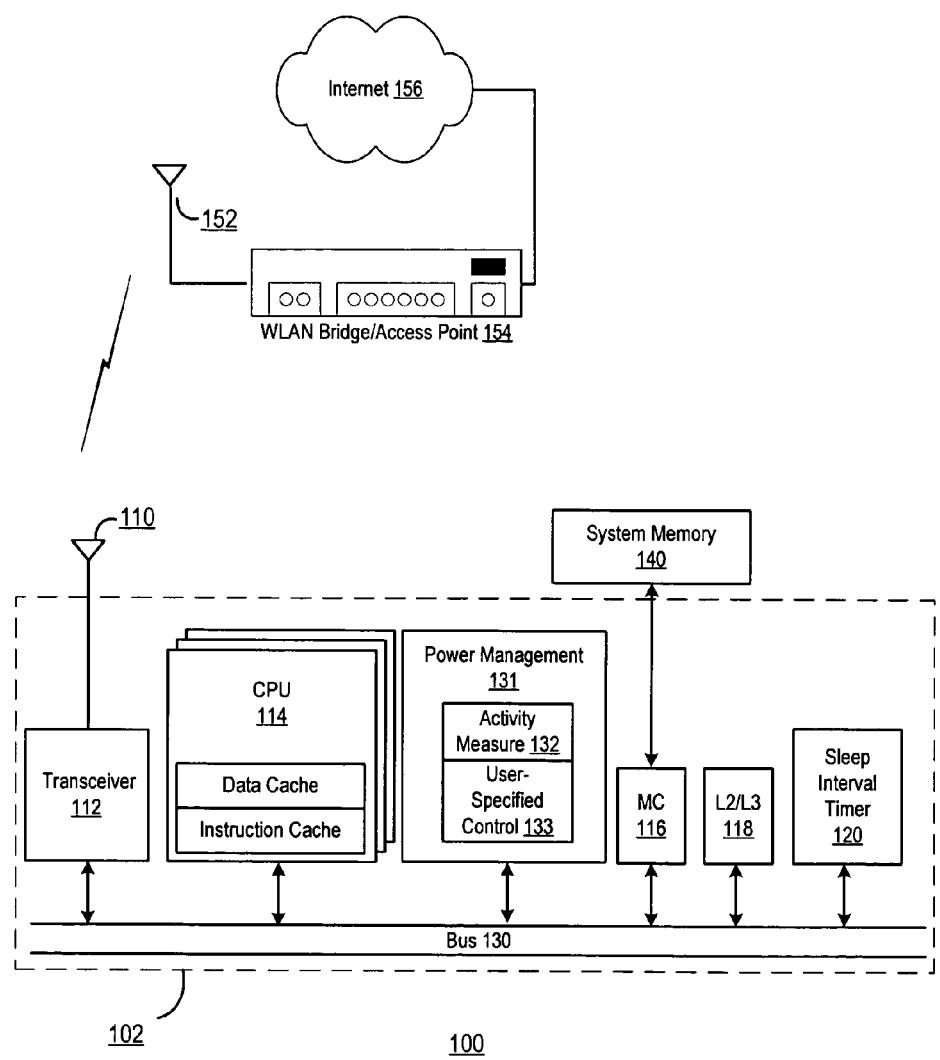
FIG. 2 is a schematic block diagram of a wireless communication device in accordance with an exemplary embodiment of the present invention.

FIG. 2 is a block diagram of a communications system 100 illustrating one or more embodiments of the adaptive power management system in accordance with the present invention. In addition to being implemented on conventional computers and/or communications systems, the present invention may also be implemented on mobile devices, such as personal digital assistants (PDA), mobile or cellular phones, smart phones, two-way radio, laptop computer, home entertainment equipment, etc. and other mobile devices that include programmable capabilities such as telecommunications, global position system (GPS) detection, camera or video imaging, multimedia messaging (MMS), Internet features and the like. In addition, the present invention may be implemented in a mobile computing device using a software modem to communicate in accordance with a wireless communication protocol, such as GSM, V.90, ADSL, HomePNA, Wireless LAN, etc. With the additional mobility, increased computing power and new telephony and computer-based functions being provided in mobile computer-based devices, improved power management may be provided by adjusting the sleep interval for the receiver and/or transmitter processing activity. By controlling the sleep interval to track actual workload requirements, power usage is reduced. Power usage may also be reduced by allowing the user to control the sleep interval to increase power savings to a point that does not unacceptably diminish device performance.

In the communications system 100 depicted in FIG. 2, a mobile computing device 102 includes one or more central processing units (host or CPU) 114, a system bus 130, system memory 140, a memory controller 116 (which is used to manage memory operations with respect to a system memory 140), a power management module 131 and a programmable adjustable sleep interval timer 120. In selected embodiments, the system memory may or may not be connected through a controller 116, and may be implemented as on-board or off-chip primary (L1), secondary (L2) and/or tertiary (L3) cache memory 118 (illustrated in FIG. 2 for architectural purposes as being directly connected to the bus 130), DDR SDRAM module(s), Flash, RAM, ROM, PROM, EPROM, EEPROM, disk drive memory devices, and the like. For clarity and ease of understanding, not all of the elements making up the mobile computing device 102 are described in detail. Such details are well known to those of ordinary skill in the art, and may vary based on the particular computer vendor and microprocessor type. Moreover, the mobile computing device 102 may include other buses, devices, and/or subsystems, depending on the implementation desired. For example, the mobile computing device 102 may include caches, modems, parallel or serial interfaces, SCSI interfaces, network interface cards, and the like. In addition, other peripheral devices may be connected to the mobile computing device 102, either directly to the bus 130 or indirectly through a peripheral controller (not shown) for controlling communications with the device 102, including a peripheral GPS receiver device, a cell phone or similar telecommunications device and/or various input/output devices (such as a keypad, keyboard, microphone, speaker, analog signal generator, mouse, I/O pad, light or LED device, display, etc.).

In a selected embodiment, the mobile computing device 102 includes a peripheral device 112 (such as an 802.11 wireless transceiver device) which is provided to receive and transmit signals via antenna 110 to and from an access point 154 (or base station) to the Internet or other computer network 156. In operation, the wireless transceiver device 112 receives outbound data from the CPU device 114 and processes the outbound data to produce digital transmission data formatted in accordance with a particular wireless communication standard (such as IEEE 802.11 (including all current and future subsections), etc.), which is then converted to an RF signal, amplified and transmitted via antenna 110. Substantially the reverse operation is performed for data reception. As will be appreciated, the wireless transceiver device 112 may be implemented as a software modem in the mobile computing device 102, or may be implemented as a GSM (Global System for Mobile Communications), GPRS (General Packet Radio Services), EGPRS (Enhanced GPRS), 3G or EDGE (Enhanced Data GSM Environment) cell phone device, or the like.

In addition or in the alternative, the wireless transceiver device 112 may include a one or more digital processing modules and associated memory for performing communication processing in accordance with a particular wireless communication standard. The digital receiver functions may include, but are not limited to, a direct conversion (zero IF) baseband module which is implemented without requiring a communications processor. In addition or in the alternative, the digital receiver function(s) may include, but are not limited to, digital intermediate frequency to baseband conversion, demodulation, decoding and/or descrambling. The digital transmitter functions include, but are not limited to, scrambling, encoding, modulation, direct digital baseband to RF conversion and/or digital baseband to IF conversion. The digital receiver and transmitter processing modules may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module implements one or more of its functions via a state machine, analog circuitry, digital circuitry and/or logic circuitry, the memory storing the corresponding operational instructions may be embedded with the circuitry comprising the state machine, analog circuitry, digital circuitry and/or logic circuitry.

In the illustrated embodiment, the system memory 140 stores data and software programs that are executed and/or processed in connection with the operation of the mobile computing device 102. For example, the system memory stores operating system software, BIOS code, drivers and other applications relating to the operation of the device 102. In addition, the system memory 140 may store power management software to control and adjust the power consumption of the device 102, such as by controlling the sleep interval used by the processor to check for receiver activity at the transceiver 112 when the device 102 is in a sleep or idle mode. In a selected embodiment, the sleep interval is stored in a hardware register and is used by the power management software executed by the processor 114 to shut down a MAC module in the transceiver 112, which then shuts down the baseband module and RF module portions of the transceiver 112. While the example depicted in FIG. 2 depicts an embodiment where a power management module 131 is implemented in the control logic of mobile device 102, the process management functionality may also be implemented in software stored in the system memory 140. Alternatively, a device driver or other software module store in the system memory 140 may be used to implement adjustable power savings by updating power management hardware control registers 131.

The power management software may also be configured to transmit coordination information to a central transmit/receive station 154 (such as a base station or access point) so that signals sent to the device 102 are synchronized with the central station so that signals are not sent to the device 102 when it is in a sleep or idle mode. For example, the device 102 may be configured to wakeup at designated wakeup times that are first multiple of the beacon count transmitted by the access point/base station, at which time the device 102 wakes up to receive frame data indicating that traffic is waiting at the access point/base station 154, and then receives the traffic and returns to sleep mode. If the sleep interval is changed (e.g., to a second multiple of the beacon count), the device 102 can notify the transmit/receive station 154 of this change, thereby permitting the transmit/receive station 154 to adjust its expectations about the activity of the device 102. Transceiver circuitry 112 may be optimized to wake up shortly before the beacon signal with sufficient time to stabilize the radio, receive and decode the expected traffic pending indication frame (and any associated traffic data) before going back to sleep, all under control of the power management software. While a variety of hardware configurations may be used to implement the power management techniques described herein, a highly suitable example is described in the pending applications entitled "Wireless Computer System With Latency Masking" "Wireless Computer System With Queue And Scheduler" "Wireless Computer System With Frame Mapping" and "Hardware/Software Split for a Networking Device" each of which is incorporated by reference in its entirety as if fully set forth herein.

As depicted in FIG. 2, the program management module 131 stores one or more programmable control parameters used to set the sleep interval for the sleep interval timer 120. For example, an activity measure control parameter 132 may define a threshold level of device activity that, if surpassed, causes the device 102 to enter the active mode and/or causes the sleep interval timer to revert to a default sleep period. In addition, the activity measure control parameter may define a threshold level of device non-activity or inactivity that is used to detect when the device 102 is not active, in which case a sleep mode may be entered and/or the duration of the sleep period or listening interval may be increased. In a selected embodiment, the duration of the sleep period may be incremented by a fixed amount each time the activity measure control parameter is or is not exceeded, as the case may be. Alternatively, the duration of the sleep period may be incremented as a function of the device activity, so that relatively low levels of activity for the device (e.g., a highly inactive device) result in larger increments to the sleep period, while relatively higher levels of inactivity (e.g., a less inactive device) that is still below the threshold level of device inactivity result in smaller increments in the sleep period. As will be appreciated, a maximum sleep period should be specified above which the sleep period may not be incremented, in order to maintain a baseline level of device performance.

The activity measure control parameters may be stored in one or more hardware control registers by the power management module 131 during startup to configure the device 102 to run in an adaptive power management mode. In accordance with a selected embodiment, one configurable parameter is used to specify a threshold measure of the percentage of idleness for the device 102 that is used to increment the listening interval used by the processing module(s) used to implement the receiver 112. Depending upon the type of device activity (e.g., web browsing, streaming audio and/or video data, image processing, etc.) being monitored, this parameter might be set to a value of "0%," but the targeted idleness measure may also be a non-zero value. For example, a non-zero value of 50% is used by the power management system to increase the listening interval for the timer 120 if the measured device activity is at least 50% idle during steady state workloads (where an idle CPU is 100% idle and a fully active CPU is 0% idle).

With respect to the wireless communication example depicted in FIG. 2, the central processing unit 114 may be employed for the logic of frame assembly and disassembly, as well as management policy implementation. In a selected embodiment, a control loop between the device 102 and the WLAN bridge/access point 154 is used to coordinate the signal transmissions while adjusting the power state of the transceiver 112. This permits the transceiver 112 to be implemented without a communications processor because the host CPU 114 can be used to decide on powering the wireless network transceiver 112 and to coordinate the transceiver activity with the transmit activity of the WLAN bridge/access point 154. For this control loop to balance connectivity and the power saving, the host microprocessor 114 monitors the network activity, adjusts the listening interval in response thereto and transmits coordination signals to the WLAN bridge/access point 154 so that frame renegotiation between the WLAN bridge/access point 154 and the device 102 can occur.

As will be appreciated, a measure of device idleness or activity may be implemented in a variety of ways, including but not limited to using an idle tick counter, instruction code pre-fetch latency monitoring, instruction cache activity measure and the like. Idleness may also be detected by checking the CPU sleep/active register, in which case the CPU 114 is 100% idle when the CPU sleep/active register indicates the CPU is in idle state and 0% idle during over capacity workloads. In addition, the idleness may be measured by checking the data flow through transceiver 112. The detection of device inactivity and corresponding adjustment of the sleep period may be made on multiple occasions over time (such as at periodic or predetermined intervals or in response to the sleep interval timer) in such a way that the sleep period may increase over time, up to a point, thereby obtaining increased power savings.

In a selected example of operation, the wireless computing device 102 depicted in FIG. 2 is either transmitting or receiving traffic to or from the network. In the transmit case, the hardware 102 of the wireless system may be set in a power save mode by software stored in the system memory 140, and this mode may be adjusted, such as by lengthening the listening interval, in response to connectivity conditions detected by the power management software. If the software does not set the device 102 into this mode, then the device does not enter into a power save state. As will be appreciated, this change into and out of a power save state has implied network protocol behavior. When the hardware 102 is in the power save state, it automatically powers up as a result of software submitting a frame to one of the queues. This request to transmit would then cause the hardware 102 to power up long enough to serve the request and to either receive the acknowledgement of receipt or exhaust the specified retry attempt count, whichever came first. In both cases, the hardware 102 may then automatically assume the power save state without the need for further software intervention. In the receive case, the system control may behave in the same way as in the transmit case. When the hardware 102 is in the power save state, it automatically wakes up to receive network management information at a listen interval which may be dynamically adjusted based upon detected network or connectivity conditions. The management frame would then be evaluated and if no traffic was pending, the software would put the hardware back into the power save state.

Figure 3:
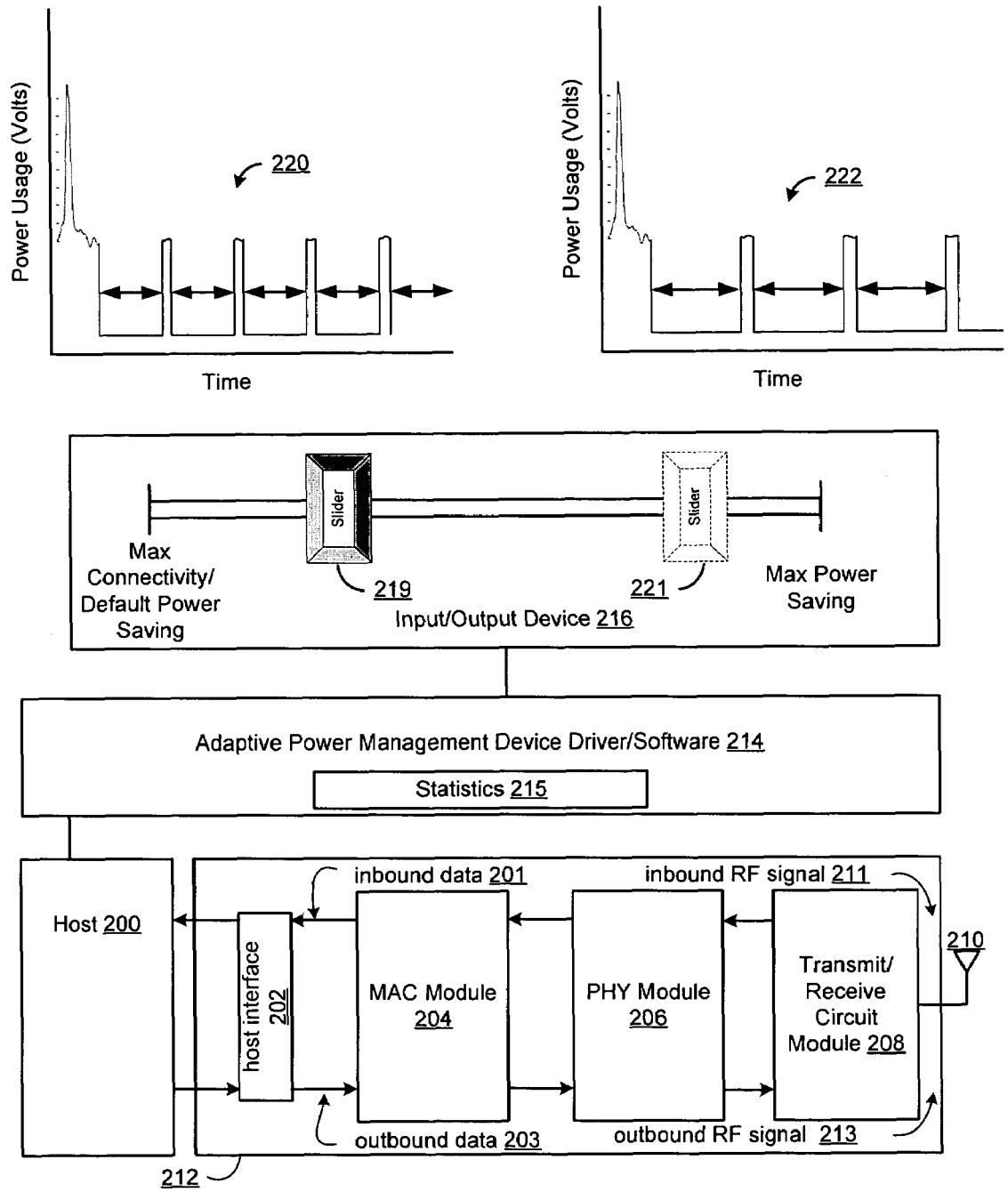
FIG. 3 depicts the use of a software-based control mechanism for implementing adjustable power management in accordance with selected embodiments of the present invention.

FIG. 3 depicts the use of a software-based control mechanism for implementing adjustable power management in accordance with selected embodiments of the present invention. As illustrated, a user-specified control parameter is used to define a sleep interval that the user may select for the device, allowing the user to increase the sleep interval (and thereby maximize power conservation) up to a point that the device performance is still acceptable for the user. In an exemplary implementation, an adaptive power management program 214 provides an input/output interface (such as a slider 219 in a display window 216) whereby the user may control the sleep interval for the device 212 which is illustrated in this example as being a WLAN communications device 212 connected to a host device 200. For example, if the user specifies a first level of power saving (such as indicated by the position of slider button 219), a first sleep interval is specified, resulting in a first detection profile 220. With detection profile 220, the hardware components of the device 212 are periodically powered down so that at least the antenna 210, transceiver module 208, PHY module 206, MAC module 204 and/or host interface 202 periodically turn on only after the sleep interval to determine if any receiving or transmitting operations are required. If the user wishes to increase the power saving to a second level, the adaptive power management program 214 detects a change in the position of slider button (as indicated at slider position 221) and specifies a second sleep interval, resulting in a second detection profile 222 which has lower power consumption and connectivity. As will be appreciated, the slider button can be moved to any position to specify a level of power saving that maintains acceptable connectivity performance.

In accordance with the present invention, the timing interval information (such as the listening interval) specified by the wireless communication protocols (such as 802.11) may be stored as a hardware parameter during device start up. In a selected embodiment, the sleep interval is stored in a hardware register and is used by the adaptive power management program 214 to shut down the MAC module 204 in the transceiver 212, which then shuts down the baseband or PHY module 206 and the RF module 208 of the transceiver 212. By making the parameters programmable, they may be dynamically adjusted under control of power management software in response to traffic conditions for the device that are captured as statistical information. While various hardware configurations may be used as the infrastructure to support the power saving software, in an exemplary embodiment, the statistical information 215 (provided by hardware and/or software) is stored (i.e., in a device driver), and the control path (whether implemented as software and/or hardware) uses the statistical information to adjust the timing interval. Each time the control path requests statistical information from the device driver, the request may clear the statistics.

Figure 4:
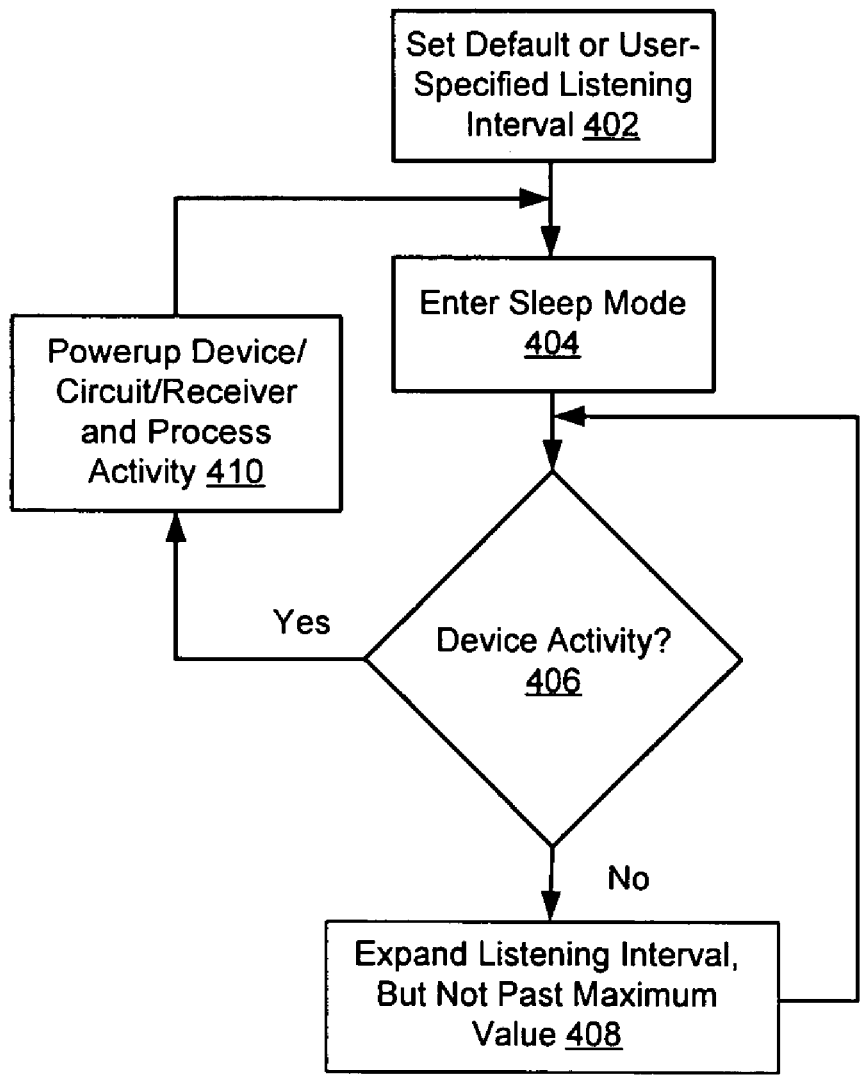
FIG. 4 depicts an exemplary flow methodology for implementing an adjustable power management embodiment of the present invention.

Turning now to FIG. 4, an exemplary method for implementing various embodiments of an adjustable power management system is illustrated. The method begins at step 402, where a listening interval is specified. This may occur in a variety of ways, including using a default listening interval. Alternatively, the user may specify a listening interval using a software-controlled input/output interface to set a specific level of power saving that may be adjusted up or down as the user wishes to reflect performance requirements that would otherwise be limited by a particular power saving level. For example, a software-based slider button implemented in a display may provide various levels of power saving that are available for selection by the user at any time.

Subsequently, the device enters a sleep mode (step 404). This can occur in a variety of ways. For example, if the level of device activity is below a threshold level, then the adjustable power management system software places the CPU in an idle or sleep mode.

At decision 406, it is determined whether there is any device activity that requires the device to leave the sleep mode and to be powered up into active mode. Again, the requisite level of device activity can be determined in a variety of ways, including checking the CPU sleep/active register, monitoring any data flow or direct memory access (DMA) transfer activity, monitoring an idleness measure for the device, detecting specific types of application activities (such as web browsing, audio or video streaming, image processing or other audiovisual applications) and the like. In a selected embodiment, this decision may be made by a device driver in the adaptive power management software 214.

If a requisite level of device activity is detected ("yes" outcome from decision 406), whatever module device (e.g., device 102) or circuit (e.g., transceiver module 208) that was in sleep mode is powered up and the detected activity is processed (step 410). For example, if the receiver circuitry in transceiver module 208 was in a sleep mode, the opening of a browser application could trigger the adaptive power management software 214 to activate the receiver circuitry so that browsing operations could be performed wirelessly.

As will be appreciated, steps 402, 404, 406 and 410 may be the only steps from FIG. 4 used when implementing a selected embodiment of the present invention to permit user control of the power saving levels. Using only these steps, the user defines or adjusts the power saving through direct input to the device, and the device may maintain that power saving level indefinitely or until such time as device activity is detected.

On the other hand, and in accordance with an alternative embodiment of the present invention, if it is determined at decision 406 that the requisite level of device activity is not detected ("no" outcome from decision 406), the listening interval may be adjusted or expanded by a predetermined amount (step 408) before returning back to detect if there is any device activity. In a selected implementation, the existing listening interval (as established at step 402 either by default or by user choice) is incremented slightly (e.g., from 1 second to 1.1 seconds) at step 408. As described herein, the listening interval adjustment may be made periodically, on a predetermined schedule, or in synchronicity with the sleep cycle. While the adjustment step 408 may be used to increment a user-specified listening interval, it is not necessary to do so in accordance with various embodiments of the present invention.

As described herein and claimed below, a method and apparatus are provided for providing an adjustable sleep mode that may be set by direct user choice and/or may be tuned automatically in response to recent usage. As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, PROM, EPROM, EEPROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the adjustable power management system contained therein.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A communication system, comprising:
   a communication device configured to run in an active mode and a sleep mode during which a user-specified listening interval is used to power up the communication device from the sleep mode to detect any processing activity that requires the communication device to enter the active mode; and
   a memory for storing a power management module for monitoring the communication device activity to directly control entry of the communication device into the sleep mode without requiring external intervention and to adjust the listening interval in response to a predetermined condition to thereby adjust power saving performance for the communication device, where the power management module provides an input/output interface that permits a user to control the user-specified listening interval.

2. The communication system of claim 1, where the listening interval is adjusted by incrementing the listening interval when the power management module detects that the communication device activity is below a first threshold level of activity.

3. The communication system of claim 1, where the listening interval is adjusted by incrementing the listening interval up to a maximum listening interval when the power management module detects that the communication device activity is below a first threshold level of activity.

4. The communication system of claim 1, wherein the communication device comprises a wireless transceiver for connection to an external network, where the listening interval is adjusted by incrementing the listening interval when the power management module detects that the wireless transceiver has been inactive for more than a threshold amount of time.

5. The communication system of claim 1, further comprising a wireless transceiver for connecting the communication system to an external network, where the power management module adjusts the listening interval in response to recent transceiver traffic activity.

6. The communication system of claim 1, where the user-specified listening interval that a user may select for the communication device is different from a default listening interval, in which case the power management module adjusts the listening interval to the user-specified listening interval.

7. The communication system of claim 1, where the communication device leaves a sleep mode and enters an active mode when the power management module detects communication device activity.

8. The communication system of claim 1, where the input/output interface comprises a slider in a display window which the user may use to control the listening interval.

9. The communication system of claim 1, where the power management module adjusts the listening interval in response to recent communication device usage.

10. The communication system of claim 1, where the communication device comprises a wireless 802.11 receiver device, and the power management module comprises a software means for adjusting the listening interval.

11. An article of manufacture having at least one recordable medium having stored thereon executable instructions and data which, when executed by at least one processing device, cause the at least one processing device to:
    place a peripheral device in a sleep mode when a threshold level of idleness is detected at the peripheral device without requiring further software intervention;
    periodically wake up the peripheral device using a wake up interval having a default value; and
    adjust the wake up interval in response to a predetermined condition comprising entry of a user-specified wakeup interval, in which case the at least one processing device adjusts the wakeup interval to the user-specified wakeup interval.

12. The article of manufacture of claim 11, where the predetermined condition comprises a change in activity for the peripheral device.

13. The article of manufacture of claim 11, where the peripheral device comprises a receiver device, and the predetermined condition comprises a change in connectivity for the receiver device.

14. The article of manufacture of claim 11, where the peripheral device comprises a transceiver device and the predetermined condition comprises an increase in traffic over the transceiver device.

15. The article of manufacture of claim 14, where the transceiver device is compliant with IEEE 802.11.

16. The article of manufacture of claim 11, where the wakeup interval is adjusted by incrementing the wakeup interval when the peripheral device has been inactive for more than a threshold amount of time.

17. In a wireless communication device, a method for controlling power save operations, comprising:
    setting a listening interval at a user-specified duration that is different from a default listening interval;
    placing a communication device in a sleep mode until the listening interval expires, at which time the communication device is powered up to detect if there is any activity for the communication device;
    monitoring an activity measure for the communication device; and
    dynamically adjusting the listening interval when a change in the activity measure is detected.

18. The method of claim 17, where the listening interval is adjusted by lengthening the listening interval when the communication device has been inactive for more than a threshold amount of time.

19. The method of claim 17, where the listening interval is incremented when traffic activity on the communication device is below a first threshold value, and is returned to the default value when traffic activity on the communication device is above a second threshold value.

* * * * *